United States Patent [19]
Schneider

[11] 3,869,114
[45] Mar. 4, 1975

[54] ROPE HAVING TENSION-CUSHIONING SHOCK ABSORBER

[75] Inventor: Herbert Schneider, Heimhausen, Germany

[73] Assignee: Rosan Enterprises, Newport Beach, Calif.

[22] Filed: Sept. 24, 1973

[21] Appl. No.: 399,947

[30] Foreign Application Priority Data
Sept. 26, 1972 Germany.................... 2247193

[52] U.S. Cl. ............................................... 267/69
[51] Int. Cl. ............................................... F16f 1/46
[58] Field of Search .......... 267/69, 74, 73; 114/213

[56] References Cited
UNITED STATES PATENTS
2,364,081 12/1944 Lambert .............................. 267/69
2,878,013 3/1959 Piodi.................................. 114/213

*Primary Examiner*—James B. Marbert
*Attorney, Agent, or Firm*—Gilbert A. Thomas

[57] ABSTRACT

The instant invention is comprised of a rope having a tension-cushioning shock absorber whereby the rope is passed through oppositely arranged openings in a rubber element which has high extensibility and resilience, said rope being firmly fixed to opposite points of said rubber element by means of clamps and abutments whereby the length of the rope section situated between the abutments is loosely wound when unloaded or lightly loaded and the axial length of said rope section corresponds to the maximum extended dimension of the rubber element whereby said loosely wound rope section is completely stretched out when under full tension load so that any initial shock is absorbed by the rubber element and the maximum tensile stress is absorbed by the rope.

14 Claims, 11 Drawing Figures

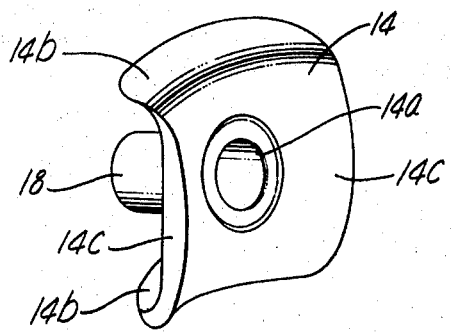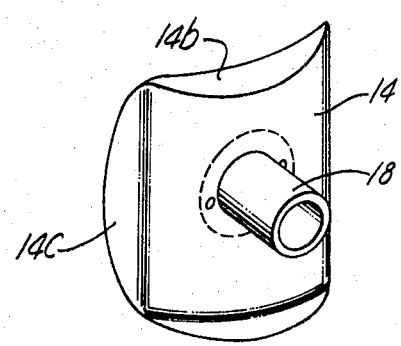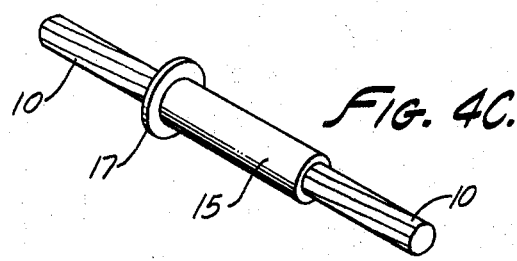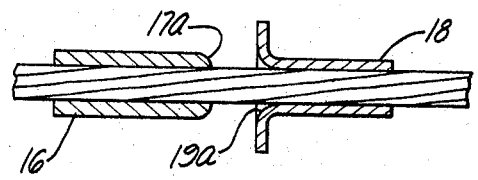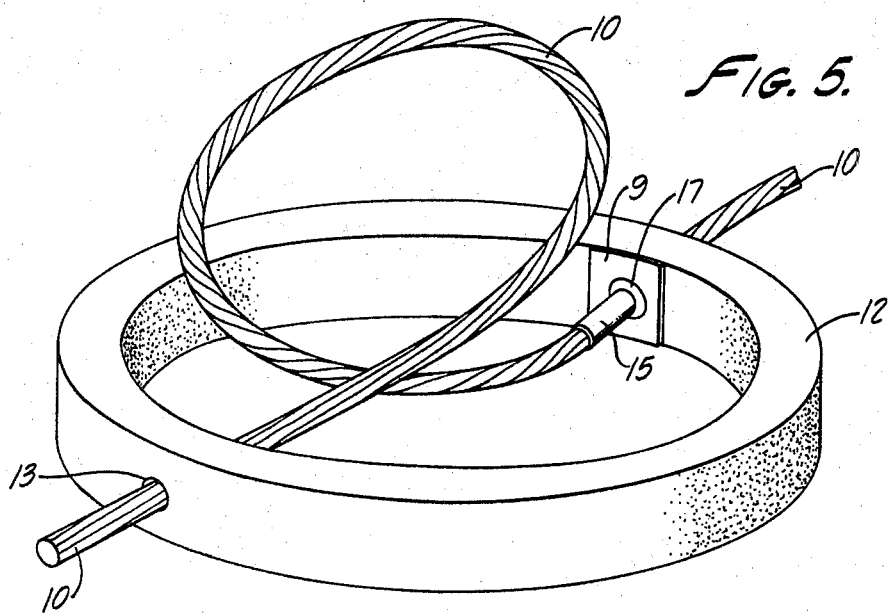

ROPE HAVING TENSION-CUSHIONING SHOCK ABSORBER

This invention relates to a rope having a tension-cushioning shock or yank absorber which can be used as a tow rope for motor vehicles or as safety rope for construction workers and mountain climbers.

Heretofore, ropes of this type, especially tow ropes with shock absorbers, normally utilized steel springs in differing arrangements and designs whereby the tension springs supported the full tension load acting upon the rope. Thus these ropes were easily fatigued resulting in fracturing of the springs. These springs were further disadvantageous in that the tension springs had a comparably short spring movement. Accordingly, they were not able to sufficiently prevent undesirable yanking during starting and towing of vehicles, which normally leads to damage of the rope as well as the vehicle.

The object of this invention is to provide a rope with a tension-cushioning shock or yank absorber which not only results in a much greater dampening of tensile stress thereby eliminating harmful impact on the rope so as to better avoid material failure than heretofore known ropes of this type, but which at full tension load does not transfer the tensile stress into the yank absorbing element, rather absorbs it entirely itself instead.

The instant invention overcomes the disadvantages of prior tensioning-cushioning ropes by utilizing a very ductile rubber element having high resilience characteristics through which a part of the rope, having a length corresponding to slightly less than the expected maximum dimension of the rubber element when fully stretched, is secured in such a manner that a tension load acting upon the rope is initially absorbed by the rubber element, and at maximum tensile stress, by the rope itself.

The instant invention is comprised of a rope having a tension-cushioning shock absorber whereby the rope is led through oppositely arranged cutouts of a rubber element having high extensibility and resilience, which rope is firmly fixed to the rubber element at opposite points by means of rope clamps and abutments whereby the length of the rope section situated between the abutments corresponds to the maximum extensibility of the rubber element. The rope section between the abutments is in a loosely wound position when unloaded or lightly loaded, but is completely stretched out when under full tension load.

The rope of this invention may consist of conventional materials normally used for this purpose e.g. steel, hemp, or plastic. Steel ropes may be enclosed in a plastic, e.g. polyvinylchlorid sheath in the usual fashion. The rope ends may be provided with conventional attachments means e.g. hooks, eyelets or snap hooks consistent with design requirements.

The rubber shock absorber elements may be made of a variety of rubber compositions provided they meet the requirements of shore hardness, extensibility and quality. Suitable synthetic rubbers for instance have a stretchability of approximately 400 percent. Rubber elements in ring form made of such materials permit a bridging of tensile stresses over a length almost 10 times greater than is attainable with the heretofore known tension springs.

This invention makes it possible to provide a rope with the capability of cushioning and equalizing tension stresses to a heretofore unattainable extent so that in addition to being utilized as safety rope for workmen and mountain climbers, it can be especially advantageous for use as a tow rope for motor vehicles and the like.

A further advantage of the rope disclosed by this invention is that when used for towing vehicles, the rubber element being used as a shock absorber can easily be installed in the front quarter of the tow rope with respect to the tow vehicle so that the driver of the vehicle being towed can observe the loading condition of the shock absorber element and can adjust his driving attitude accordingly.

Still another advantage is that at full tension strain, the load is fully carried by the rope itself so that the rubber element working as the shock absorber is never overstressed, but is only loaded to a predetermined level.

Other objects and advantages of the invention will be readily apparent from the following description taken in conjunction with the accompanying drawings in which:

FIGS. 4A and 4B are perspective views of a holding device for usage in shock absorbers according to the rope of FIGS. 1 through 3, wherein FIG. 4A illustrates a view from the inside of the ring and FIG. 4B shows the corresponding rear view;

FIGS. 4C and 4D are perspective views, partly cross-sectioned, of a rope section provided with a rope clamp which, when inserted into the central cutout of the holding device shown in FIG. 4A anchors the rope in the shock absorber;

FIG. 5 is a perspective view of another embodiment of this invention wherein the holding device shown in FIGS. 4A and 4B is a flat steel plate;

Figure 1:
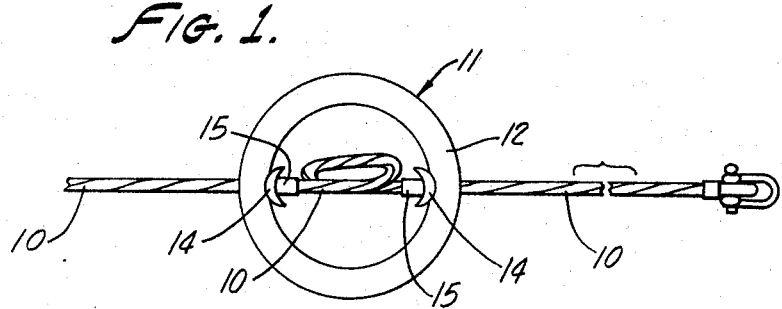
FIG. 1 is a top view of the rope with shock absorber of this invention showing the rope and shock absorber in an unloaded condition.

In FIGS. 1 through 4 reference numeral 10 identifies generally the rope of the yank absorber of the instant invention which is especially well suited as a tow rope for motor vehicles or the like. According to this preferred embodiment, the yank absorbing rubber element 11 consists of a rubber ring 12 which has an extensibility of approximately 400 percent.

The rubber ring 12 has oppositely arranged cutouts or holes 13 through which the rope 10 passes. The portion of the rope 10 located within the hollow of the rubber ring 12, has a length corresponding slightly less than the maximum extensibility of the rubber ring (see FIG. 2) and is anchored to the rubber element by holding devices 14 in conjunction with the rope clamps 15 and 16. Rope clamps 15 and 16 are pressed into the rope 10 and are provided with a clamp shoulder 17 or a clamp radius 17a respectively, which find their abutment in holding devices 14, either in its opening 14a or in its flange 14b (see FIGS. 4C and 4D).

Figure 2:
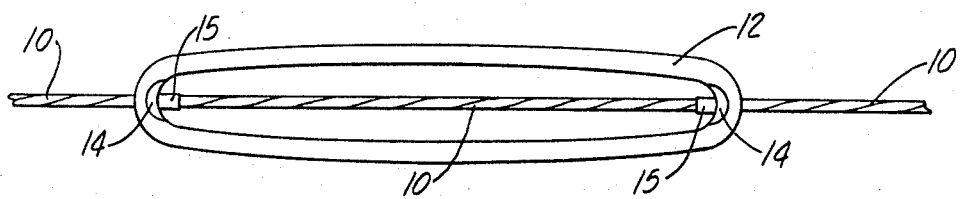
FIG. 2 is a top view of the rope shown in FIG. 1, where the rope and shock absorber are shown under maximum tension load.
Figure 3:
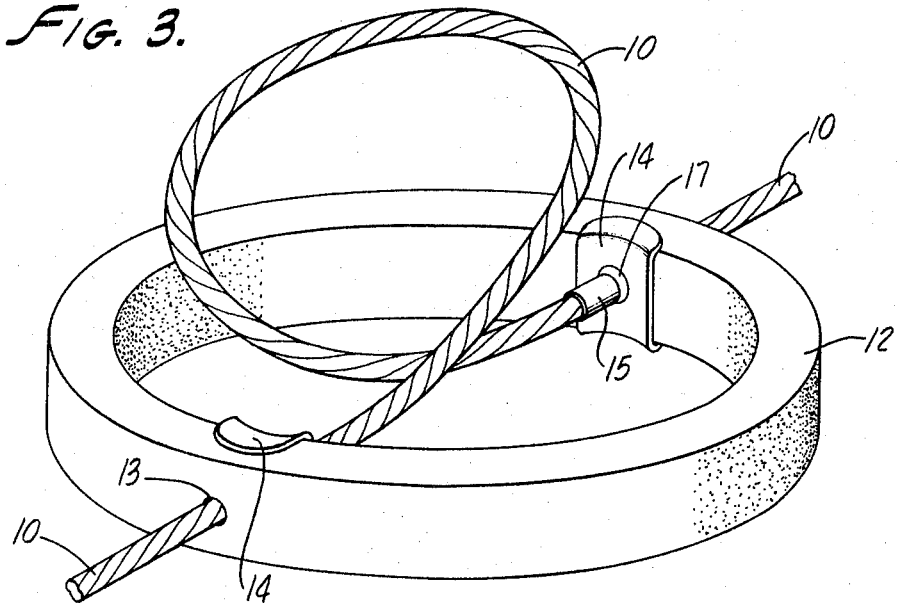
FIG. 3 is a view, in perspective, of the rope shown in FIG. 1.

Each holding device 14, shown in detail in FIGS. 4A and 4B, possesses a tubelike extension 18 (see FIG. 4D) for introduction of rope 10 into the opening 13 of the rubber ring 12 from its inside which extends approximately to the middle of said hole 13. Each holding device 14 is formed with flanges 14c on its sides, and upper and lower flanges 14b in such a way that when the protrusion (extension) 18 is fitted into the hole 13, the upper and lower bends provide an additional guide and support for the formed rubber ring 12. The flanges 14c on the sides of the holding device 14 provide a rounded bearing surface for the inside of the rubber ring 12 when the ring is subjected to a tensile load as shown in FIG. 2.

The configuration of the holding devices 14 results in deformation of the rubber ring 12 which preserves the material when under tension loads.

In addition to the aforesaid holding and guiding functions, the holding devices 14 also act as an abutment for the clamps shoulder 17 and the clamp radius 17a, respectively, of the rope clamp 15 and 16. The pieces of rope which are fitted with the rope clamps are introduced into the cutout 14a or the hollow rivet head 19a, respectively. The portion of the rope contained within the inside of the ring 10 is confined in its outward movement. By introducing a tension load into the rope, the rubber ring 12, acting as a shock absorber, is stretched until the total tension load is carried by the fuly stretched rope (see FIGS. 1 and 2).

In FIG. 5, the holding devices 14 are replaced by a flat steel plate 20 which has a hole, not visible, corresponding to the cutout 14a and seats against the inside of the rubber ring 12. If desired, it may be connected with ring 10 or preferably has a tube-like protrusion 20b similar to tube extension 18, which is inserted into the cutout 13 of rubber ring 12 as hereinbefore mentioned. The flat steel plate 20 has the advantage of being simpler and a less costly concept, but does not have the advantage of a rounded bearing surface which protects the material of the deformed rubber ring 12 under full tension as do holding devices 14. All other elements and their respective functions correspond to the embodiment illustrated in FIGS. 1 through 3 and 4C.

Figure 6:
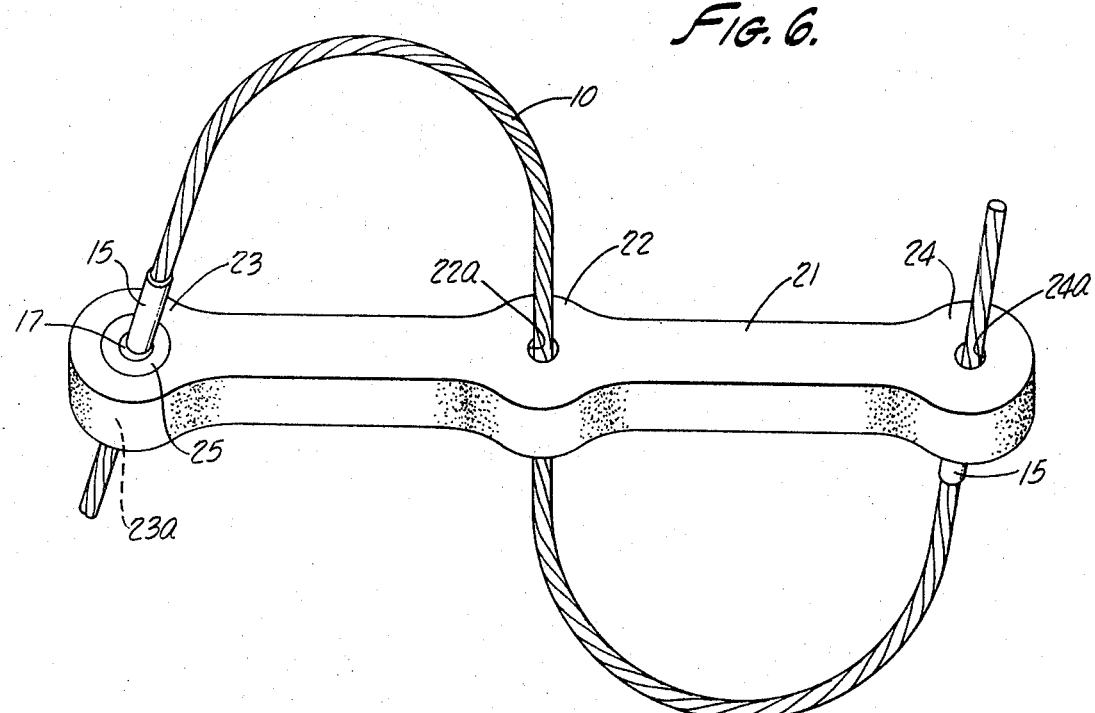
FIG. 6 is a perspective view of still another embodiment of the device of this invention wherein the shock-dampening rubber element has a dumb-bell or bar-shape configuration.

In the embodiment of FIG. 6, instead of a ring-shaped rubber element, a rubber element 21 having rod or dumb-bell configuration is used which has enlargements or bulges in the areas of high stresses under an applied tensile load, i.e., a center bulge 22 and end bulges 23 and 24. The rope 10 passes through cutouts 22a, 23a and 24a in the embodiment shown in FIG. 6, but if desired the hole 22a may be eliminated and the rope 10 may be passed through the holes 23a and 24a only In the latter case, the center bulge 22 may also be eliminated.

The abutment which provides the function of the holding devices 14 or the flat steel plate 20 is formed by the washer 25 having a hole 25a in its center similar to steel plate 20, and is seated against the rubber element 21 or attached to its surface, but preferably has a tube-like protrusion similar to tube protrusion 18 for insertion into the holes 23a and 24a. The washer 25 is used as an abutment face for the clamp shoulder 17 of the rope clamp 15 or for its clamp radius 17a, respectively.

A tensile load introduced into the rope 10 in the embodiment of FIG. 6 is carried by the rod-shaped rubber element 21 until the rope is completely stretched, and therafter assumes the full tensile load.

Figure 8:
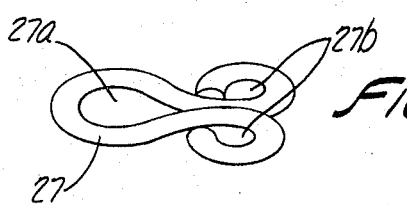
FIG. 8 is a perspective view of the holding device used in the embodiment of FIG. 7.
Figure 7:
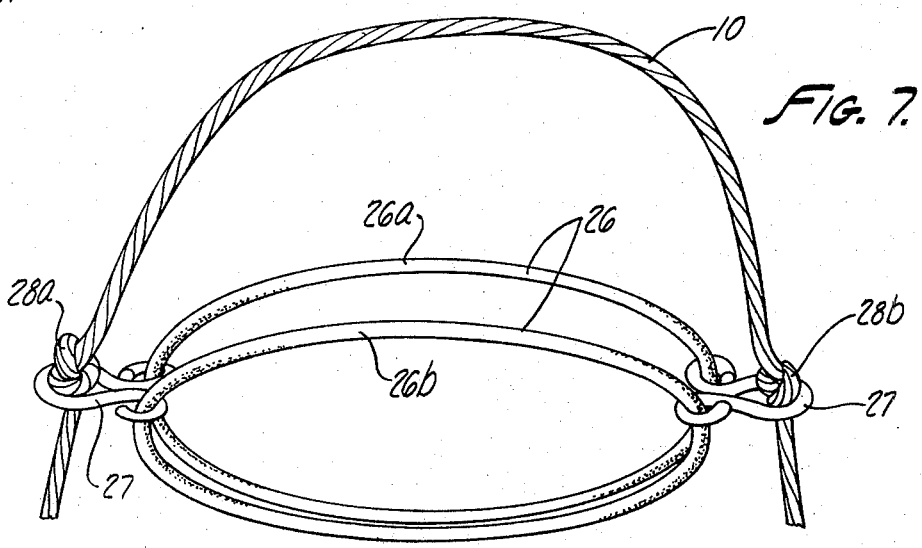
FIG. 7 is a perspective view of yet another embodiment of the invention suitable for hemp and plastic ropes in which the shock absorbing rubber element consists of two rubber rings wherein the rubber element and rope are connected to each other.

The alternate embodiment of this invention shown in FIG. 7 has the advantage of being simple and provides a lightweight shock absorber which is particularly suited for hemp and plastic ropes. The rubber element 26 acting as the shock absorber is formed by two rubber rings 26a and 26b which pass through the openings 27b of the holding device 27 of a type shown in FIG. 8, wherein the holding device 27 simultaneously acts as a guide and an abutment for the rope 10. According to this embodiment, the rope clamps may be entirely eliminated since the function of the clamp shoulder can be performed by simple knots 28a and 28b of rope 10. The opening 27a of the holding device 27 is used as an abutment face for the knots 28a and 28b. This opening thus assumes the function of hole 14a of tube protrusion 18 and butout 13 of the corresponding parts of the embodiment of FIGS. 1 through 4. When introducing a tensile load into the rope 10, this load will be absorbed by the rubber rings 26a and 26b acting as shock absorbers until the rope is fully stretched. Thereafter the total tensile load is carried by the rope 10. As can be seen, the embodiment of FIG. 7 is especially well suited as a safety rope for fall-imperiled workers and mountain climbers.

While several embodiments of the invention have been described, it is understood that the particular embodiments of the invention herein disclosed are for illustrative purposes only and that various changes may be made therein without departing from the principles of the invention or the scope of the annexed claims.

I claim:

1. A rope having a tension-cushioning shock absorber, comprising:
   a rubber element having high extensibility as well as resilience, the cross section of which is as thick or thicker than its width;
   a rope passing through oppositely arranged holes in said rubber element, said rope being secured to opposite ends of said rubber element by a plurality of clamp means and a plurality of abutment means in a manner whereby the length of the rope section situated between said abutment means corresponds to slightly less than the maximum extensibility of said rubber element so that said rope section is in loosely wound form when said rubber element is in normal or lightly loaded position whereby said rope section is completely stretched out when under a full tension load.

2. A rope having a tension-cushioning shock absorber, as described in claim 1, wherein the rubber element consists of a rubber ring the cross section of which is as wide or wider transversely than radially.

3. A rope having a tension-cushioning shock absorber as described in claim 2 wherein the abutment means are comprised of a holding device having tube extensions which are inserted into the holes in said rubber element, said holding devices being flared on their sides and edges.

4. A rope having a tension-cushioning shock absorber as described in claim 3 wherein the edges are flared in a direction opposite the side flares.

5. A rope having a tension-cushioning shock absorber as described in claim 2 wherein the rope clamp is provided with a clamp shoulder which bears against the holding device when the rope is inserted in the abutment cutout.

6. A rope having a tension-cushioning shock absorber as described in claim 3 wherein the rope clamp has a radius which bears against the holding device when the rope is inserted in the abutment cutout.

7. A rope having a tension-cushioning shock absorber as described in claim 2 wherein the abutment is comprised of a flat steel plate.

8. A rope having a tension-cushioning shock absorber as described in claim 1 wherein the rubber element is comprised of the bar portion of a dumb-bell configuration.

9. A rope having a tension-cushioning shock absorber as described in claim 7 wherein the abutment consists of a washer.

10. A rope having a tension-cushioning shock absorber as described in claim 8 whereas the bar portion of the dumb-bell has an enlarged center and holes are provided in the end bulges and the enlarged center through which the rope is passed.

11. A rope having a tension-cushioning shock absorber as described in claim 1, wherein the rope is comprised of steel.

12. A rope having a tension-cushioning shock absorber as described in claim 1, wherein the rubber element is comprised of a plurality of flexible rubber rings which pass through an opening of a holding device wherein said holding device acts as a guide as well as abutment for the rope.

13. A rope having a tension-cushioning shock absorber as described in claim 12 wherein the rope is non-metallic.

14. A rope having a tension-cushioning shock absorber as described in claim 13 wherein the rope clamp consists of a knot in said rope.

* * * * *